(12) United States Patent
Dodor et al.

(10) Patent No.: US 11,562,090 B2
(45) Date of Patent: Jan. 24, 2023

(54) ENFORCING SENSITIVE DATA PROTECTION IN SECURITY SYSTEMS

(71) Applicant: International Business Machines Corporation, Armonk, NY (US)

(72) Inventors: Dmitri Dodor, Pepperell, MA (US); Peter A. Maniatis, Clinton, MA (US); Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/424,022

(22) Filed: May 28, 2019

(65) Prior Publication Data
US 2020/0380146 A1    Dec. 3, 2020

(51) Int. Cl.
| | |
|---|---|
| *G06F 17/00* | (2019.01) |
| *G06F 21/62* | (2013.01) |
| *G06F 40/211* | (2020.01) |
| *G06F 40/216* | (2020.01) |
| *G06F 40/284* | (2020.01) |

(52) U.S. Cl.
CPC ........ *G06F 21/6218* (2013.01); *G06F 40/211* (2020.01); *G06F 40/216* (2020.01); *G06F 40/284* (2020.01)

(58) Field of Classification Search
CPC .. G06F 16/215; G06F 16/2365; G06F 40/284; G06F 16/00; G06F 16/245; G06F 16/285; G06F 16/3329; G06F 16/334; G06F 16/906; G06F 40/205; G06F 11/3476; G06F 7/14; G06F 8/427; G06F 21/577; G06F 40/211; G06F 21/10; G06F 21/6218; G06F 40/253; G06F 40/216; G06F 40/166; G06F 21/55; G06F 40/289; G06F 21/604; G06F 21/552; G06F 40/103; G06F 21/50; G06F 21/54; G06F 21/6245; G06F 21/62;
(Continued)

(56) References Cited

U.S. PATENT DOCUMENTS

| | | |
|---|---|---|
| 9,479,524 B1 | 10/2016 | Hagen |
| 2004/0093518 A1 | 5/2004 | Feng et al. |

(Continued)

FOREIGN PATENT DOCUMENTS

CN    108537042 A  *  9/2018

*Primary Examiner* — Michael Ortiz-Sanchez
(74) *Attorney, Agent, or Firm* — Jeffrey S. LaBaw; David H. Judson

(57) ABSTRACT

A security system that monitors requests to a protected resource is configured to determine that a syntactically-invalid language statement in a request is one that should be treated as a "security high risk" statement (SHRS) because it has a probability of containing sensitive data. A machine language that defines the structure and syntax of the language statements used by a client-server application may have multiple SHRSs. SHRSs are identified in advance by syntactical analysis of the language statements that comprise the machine language. The security system stores (or can otherwise obtain) a representation of each of the set of these high risk statements. In response to detecting that a request has a syntactically-invalid language statement, the system determines whether the invalid language statement has a measure of similarity sufficiently close to any of statement in the SHRS set. Upon a positive determination, an appropriate security action is taken to ensure sensitive data is not exposed.

20 Claims, 5 Drawing Sheets

(58) Field of Classification Search
CPC .. G06F 2212/1052; G06F 21/71; G06F 40/20;
G06F 21/60; G06F 40/12; G06F 21/00;
G06F 21/12; G06F 21/121; G06F 21/14;
G06F 21/16; G06F 21/602; G06F 21/606;
G06F 21/64; G06F 40/221; G06N 20/00;
G06N 5/047; G06N 7/005; G10L
2015/088; G10L 15/197; H04L 67/306;
G06K 2209/01; G06K 9/00288; G06K
9/4685; G06K 9/6272; G06K 9/6885;
G06K 9/723; G16H 50/70
See application file for complete search history.

(56) References Cited

U.S. PATENT DOCUMENTS

| | | | |
|---|---|---|---|
| 2004/0199782 A1* | 10/2004 | Arnold | H04L 63/0407 |
| | | | 726/27 |
| 2007/0136603 A1 | 6/2007 | Kuecuekyan | |
| 2010/0192201 A1* | 7/2010 | Shimoni | G06F 21/55 |
| | | | 726/3 |
| 2013/0014093 A1* | 1/2013 | Lee | G06F 8/75 |
| | | | 717/142 |
| 2014/0012833 A1* | 1/2014 | Humprecht | G06F 21/60 |
| | | | 707/711 |
| 2015/0254456 A1* | 9/2015 | Jacquin | G06F 21/6245 |
| | | | 726/1 |
| 2016/0321179 A1 | 11/2016 | Sara et al. | |
| 2016/0373456 A1* | 12/2016 | Vermeulen | G06F 16/245 |

\* cited by examiner

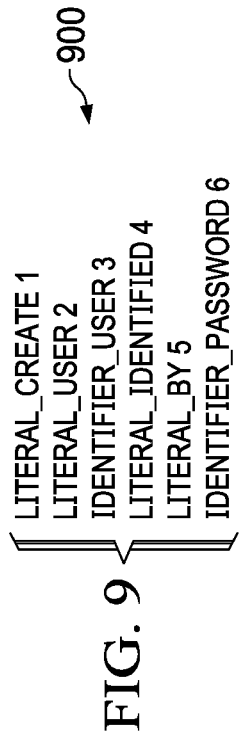

FIG. 9

LITERAL_CREATE 1
LITERAL_USER 2
IDENTIFIER_USER 3
LITERAL_IDENTIFIED 4
LITERAL_BY 5
IDENTIFIER_PASSWORD 6

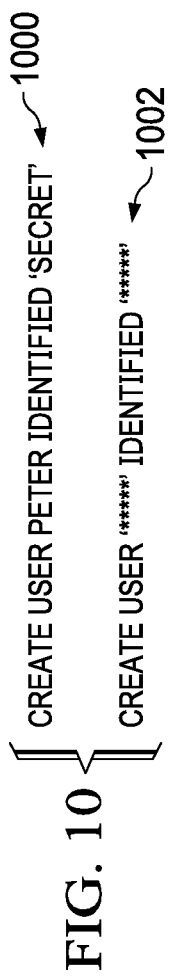

FIG. 10

CREATE USER PETER IDENTIFIED 'SECRET' — 1000
CREATE USER '***' IDENTIFIED '***' — 1002

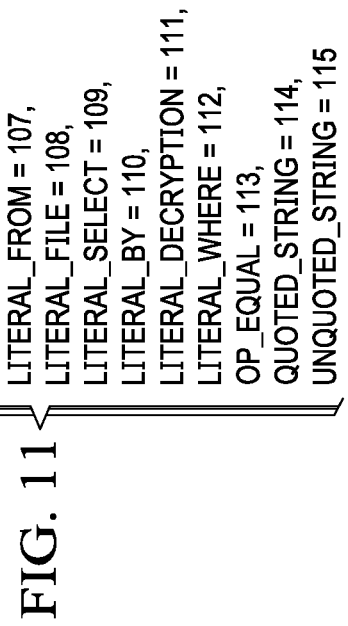

FIG. 11

LITERAL_CREATE = 100,
LITERAL_LOGIN = 101,
LITERAL_WITH = 102,
LITERAL_PASSWORD = 103,
LITERAL_RESTORE = 104,
LITERAL_MASTER = 105,
LITERAL_KEY = 106,
LITERAL_FROM = 107,
LITERAL_FILE = 108,
LITERAL_SELECT = 109,
LITERAL_BY = 110,
LITERAL_DECRYPTION = 111,
LITERAL_WHERE = 112,
OP_EQUAL = 113,
QUOTED_STRING = 114,
UNQUOTED_STRING = 115

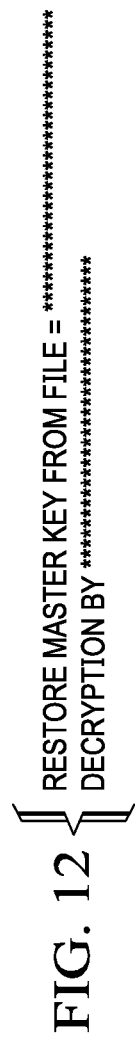

FIG. 12

RESTORE MASTER KEY FROM FILE = '****************************************'
DECRYPTION BY '****************************************'

ENFORCING SENSITIVE DATA PROTECTION IN SECURITY SYSTEMS

BACKGROUND OF THE INVENTION

Technical Field

This disclosure relates generally to securing resources in a distributed computing environment.

Background of the Related Art

Protecting various types of servers using intrusion detection is well-known. Security systems of this type typically analyze server access attempts by monitoring a network or local access to a protected server for malicious activity or security policy violations. Typically, a security system of this type includes a parser that is configured to parse client/server language statements in requests directed to the system that is being monitored. When a parsed language statement is determined to contain sensitive information, the security system can prevent that information from being exposed using dynamic data masking, or obfuscation.

Client-generated statements, however, are often prone to syntax errors when users fail to construct requests that are fully consistent with the language statement syntax. In these circumstances, the security system parser often is unable to analyze the security threat level imposed by said statements. For example, a syntactically-correct language statement may be one that requires a curled brace symbol before a particular term (e.g., "principal"), and the omission of that symbol from the request may prevent the parser from analyzing the full statement, thereby potentially exposing the sensitive information therein (the user's password or other credential) that is associated to the term. When clients issue requests to the server system that are not familiar to or otherwise recognized by the security system parser (e.g., because they include such syntactically-incorrect requests), the possibility that a user's sensitive information may not be recognized by the security system is increased significantly.

BRIEF SUMMARY

A security system that monitors requests directed to a protected resource (e.g., a database server) is enhanced by enabling the system to determine that a syntactically-incorrect language statement in a request is one that should be treated as a statement that has a probability of containing or exposing sensitive data. A syntactically-invalid (or incorrect) language statement is a statement that is misconfigured or otherwise partially-corrupted to an extent that the security system parser is unable to parse the language statement. A language statement of this type is sometimes referred to as security high risk statement (SHRS), and a particular machine language that defines the structure and syntax of the language statements used by a client-server application may have multiple SHRSs. SHRSs preferably are identified in advance by syntactical analysis of the language statements that comprise the machine language. In one embodiment, the security system stores (or can otherwise obtain) a representation (e.g., an encoding) of each of the set of these high risk statements. In response to detecting that a request has a syntactically-invalid language statement, the security system determines whether the syntactically-invalid language statement has a measure of similarity sufficiently close to any of the set of one or more language statements in the SHRS set. Upon a determination that the syntactically-invalid language statement has the measure of similarity, a given security action (e.g., dynamic masking) is taken with respect to the statement. In this way, the security system is configured to identify and appropriately manage sensitive information that may be present in these otherwise syntactically-incorrect statements after the language statement parsing fails.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 9 depicts a sample token encoding scheme derived from a query;

FIG. 10 depicts a statement conforming to the encoding scheme in FIG. 9 but that is syntactically invalid, together with the statement that results from processing according to the technique of this disclosure;

FIG. 11 depicts another example encoding vocabulary for a set of SHRSs; and

FIG. 12 depicts how a syntactically-invalid statement that is found to satisfy a similarity measure with respect to vocabulary in FIG. 11 is logged to mask sensitive information according to this disclosure.

DETAILED DESCRIPTION OF AN ILLUSTRATIVE EMBODIMENT

Figure 1:
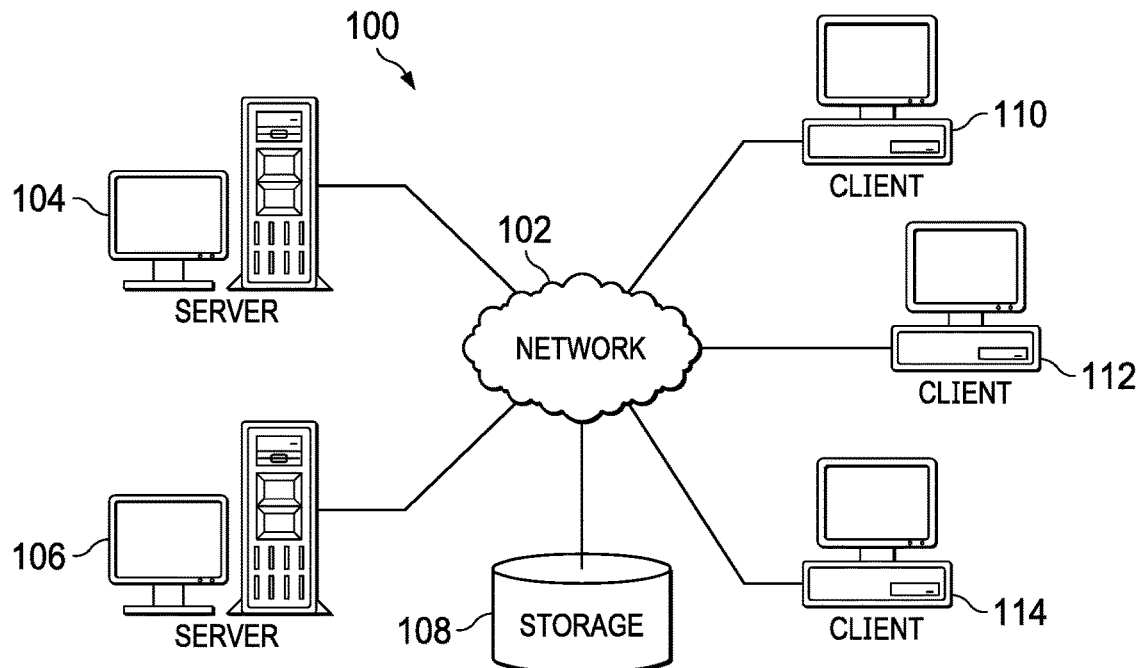
FIG. 1 depicts an exemplary block diagram of a distributed data processing environment in which exemplary aspects of the illustrative embodiments may be implemented.
Figure 2:
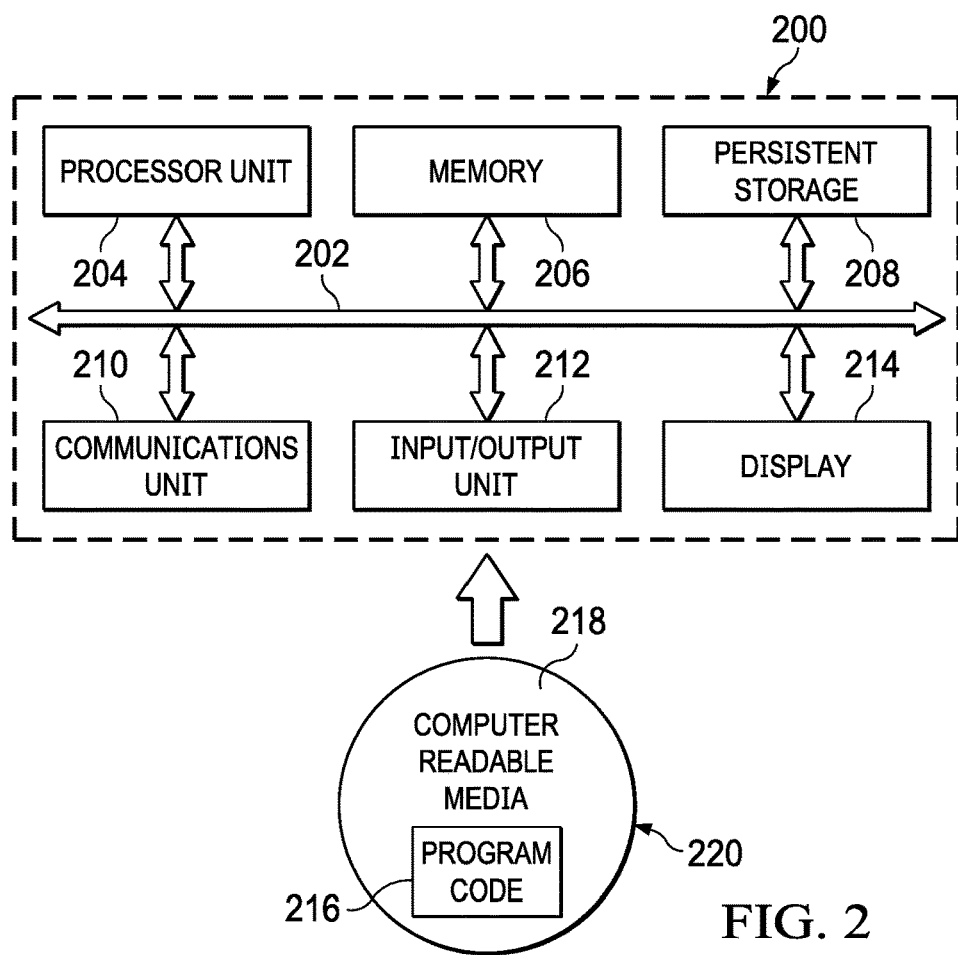
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Whose of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Monitored Server Security Systems

Figure 3:
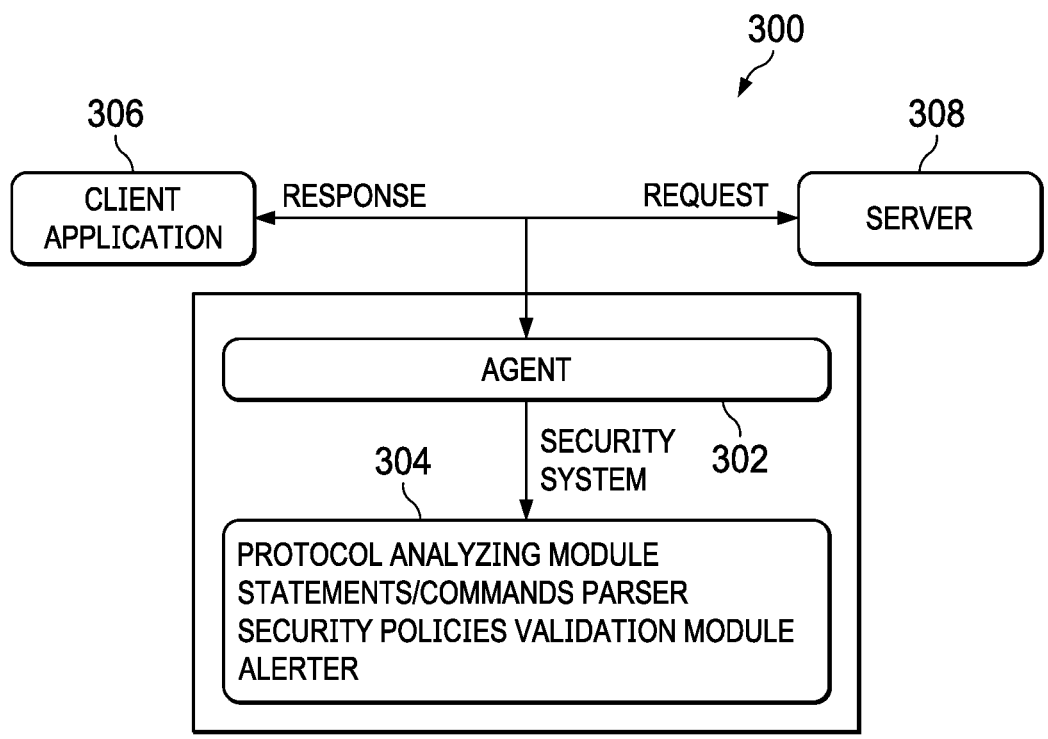
FIG. 3 depicts a generalization of a security system for monitoring a server in a client-server operating environment.

As described above, it is known to protect servers using intrusion detection. Security systems of this type typically analyze server access attempts by monitoring a network or local access to the server. FIG. 3 depicts a general solution of this type. As depicted, in this system 300 a client application 306 interacts with a server 308, and an agent 302 (which may be a proxy, or other monitoring functionality) operates to monitor both requests (to the server) and responses (from the server). The requests and responses are forwarded to a security mechanism 304. The security mechanism 304 typically includes various components, namely, a protocol analyzer module, a statements/commands (or "statement/command") parser, a policy validation module, and an alert module. Generally, the security mechanism is configured to examine the requests and the responses.

In particular, the agent 302 is configured to examine the application protocol request or response. Such a request/response is represented in the form of application protocol structure. Different types of clients/servers use different application protocol and statements/commands languages, although typically the request and response flow is common.

Typically, a request contains application protocol metadata. The protocol analyzing module extracts a statement/command from the request. To this end, the protocol analyzing module needs to be aware of the applicable application protocol structures. Statements/commands extracted by the protocol analyzing module are then passed to the statement/command parser for evaluation. The statement/command parser may successfully parse the statement/command extracted by the protocol analyzing module, in which case the statement is then evaluated against one or more security policies. As also previously described, in certain situations, however, the statement/command parser cannot successfully parse the statement/command extracted by the protocol analyzing module. This operating scenario is addressed by the technique of this disclosure, as will be described below.

Figure 4:
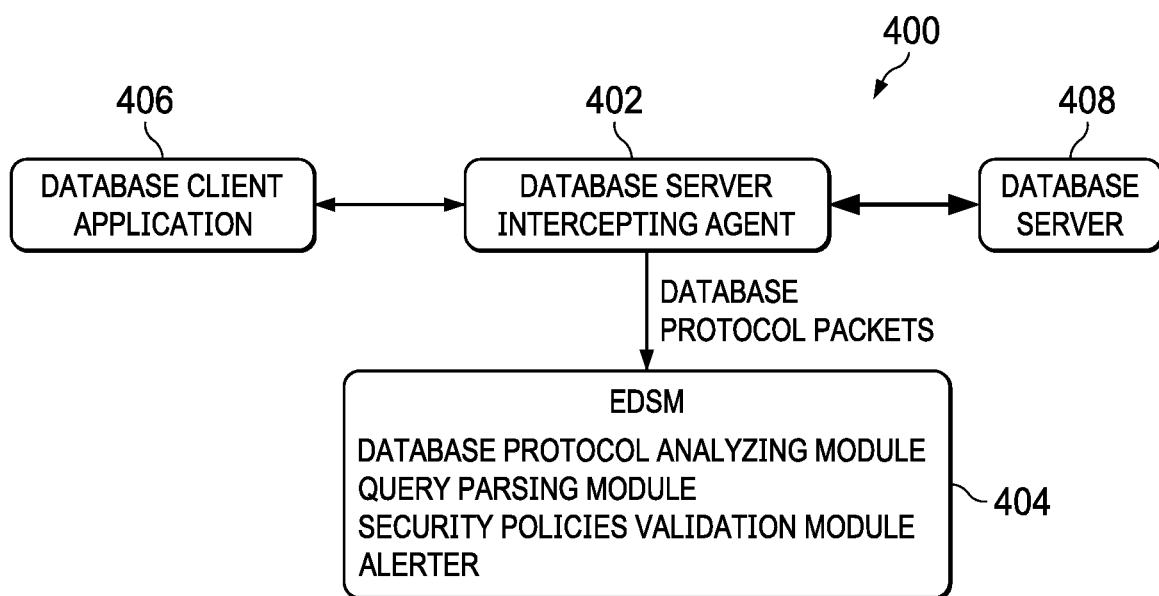
FIG. 4 depicts an access control system (e.g., for a database) that is structured with a security mechanism in accordance with the technique shown in FIG. 3.

By way of additional background, FIG. 4 depicts the basic operation of a database access control system 400 that comprises a database server intercepting agent 402 and an associated database security mechanism, e.g., an external-to-database security mechanism (EDSM) 404. As a skilled person will appreciate, the access control system in FIG. 4 is a special case of the generalized security system architecture depicted in FIG. 3. As depicted in FIG. 4, in this embodiment the agent 402 is situated in-line between a database client application 406, and a database server 408. Queries initiated to the database server 408 by the database client application 406 are intercepted by agent 402, and database protocol packets comprising those queries are forwarded to the EDSM 410 for evaluation. In this embodiment, the intercepting agent 402 typically also monitors the responses received from the database server 408. Typically, a database protocol packet refers to a formatted unit of data used in communication between the database client application and the database server. As is known, EDSM 410 typically includes several modules, e.g., a database protocol analyzing module, a query parsing module, a security policy validation module, and an alerting module. These modules typically are implemented as software executing in hardware. One core function of the EDSM is to extract the database query that is sent by the database client application 406 to the database server 408 and intercepted by the agent 402, parse this query up to a database object level, validate it (for potential database object access violations) against one of more EDSM security policies. If an access violation is detected, the EDSM issues an alert to this effect, or takes some other notification, mitigation or remediation function.

Figure 5:
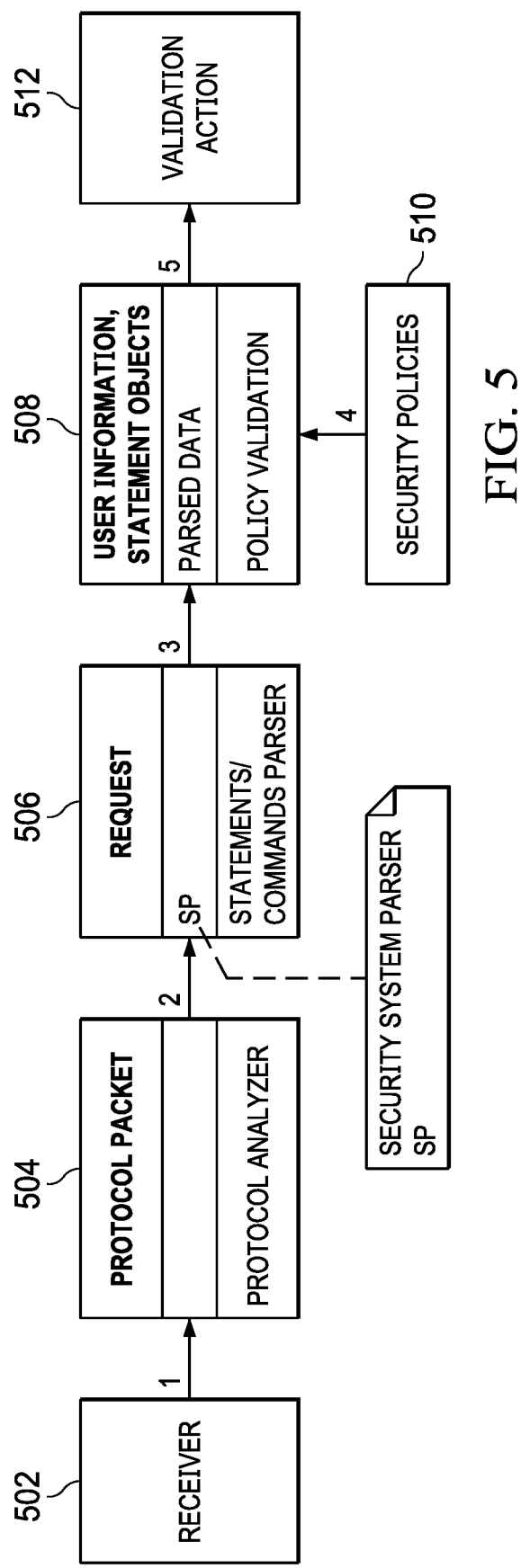
FIG. 5 depicts a security system used to monitor a server system and in which the technique of this disclosure may be implemented.

FIG. 5 depicts the various operation of the modules in a server security mechanism of the type described above. As described, the security mechanism includes various components, namely, a protocol analyzer module, a statement/command parser, a policy validation module, and an alert module. As has also been described, the security mechanism is configured to examine the requests to the server and the responses from the server. FIG. 5 depicts the operation of these modules in additional detail.

As depicted, a receiver 502 receives the query or server response, e.g. from the intercepting agent, or some other query source depending on the implementation. A protocol packet protocol analyzer 504 receives and analyzes the query or server response, as the case may be. The output of the protocol analyzer 504 is supplied to the parser 506, which parses statements/commands in the request or response in accordance with a parser grammar. Typically, the grammar is that which is associated with the system being monitored (e.g., a database server 308, 408). As described above, and with respect to a database request, the parser 506 parses the query up to a database object level, and validates the resulting parsed data 508 against one or more security policies 510. Depending on the result of this analysis, typically some form of validation action 512 is taken.

As described above, client-generated statements are often prone to syntax errors when users fail to construct requests that are fully consistent with the language statement syntax. In addition, there may be other circumstances when requests to the monitored system are otherwise partially-corrupted. In these circumstances, the security system parser often is unable to analyze the security threat level imposed by said statements.

Figure 6:
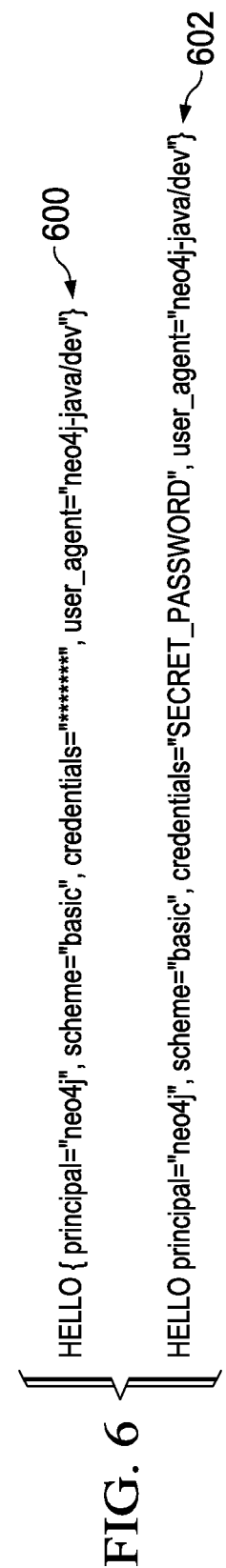
FIG. 6 depicts a syntactically-correct Structured Query Language (SQL) query and its processing by the security system shown in FIG. 5.

To provide a concrete example, FIG. 6 depicts a syntactically-correct Structured Query Language (SQL) query 600 following its processing by the security system, such as depicted in FIG. 5. In this example, the request identifies a "principal" having "credentials" that have been obfuscated as a result of the parser correctly recognizing the language statement and applying the dynamic masking as the validation action. Query 602, in contrast, has a syntax error (i.e., it is otherwise misconfigured or partially corrupt), in that it violates a language statement syntax rule, e.g., a JSON statement must have a curled brace symbol before the key "principal." Because the statement is syntactically-invalid, the parser is not able to parse it. As a result, and as depicted in FIG. 6, after passing through the security system the "credentials" portion of the query 602 remains exposed, thereby creating a security vulnerability.

The above example is not intended to be limiting, as the approach herein is designed to work with respect to any language statement that cannot be parsed (in whole or in part) by the parser. Generalizing, and as used herein, a syntactically-invalid language statement is any language statement (or portion thereof) that cannot be fully or partially parsed by the security system parser, regardless of the cause of such error or how/where the error originates.

Enforcing Sensitive Data Protection in a Security System

With the above as background, the technique of this disclosure is now described.

As described above, and according to this disclosure, a security system that monitors requests directed to a protected resource (e.g., a database server) is enhanced by enabling the system to determine that a syntactically-invalid language statement in a request is one that should be treated as a statement that has a probability of containing or exposing sensitive data. As will be described, preferably this treatment is made deterministically and, in particular, by comparing the syntactically-invalid language statement against a corpus (or, more generally, a set or grouping) of language statements that have been identified as having a probability of containing or exposing sensitive information. A language statement of this type (namely, one that has been determined to have potentially contain or expose sensitive information) is sometimes referred to herein as security high risk statement (SHRS). In the approach herein, the machine language (e.g., SQL in the above example use case), which defines the structure and syntax of the language statements used by a client-server application, is evaluated to identify SHRSs. The nature of the evaluation may vary, and there may be one or more sets or groupings of SHRSs identified, depending on the nature of the client/server application, the nature of the security threat(s), and other factors. Preferably, this evaluation is carried out in an automated manner by the parser or other security system process that is configured to understand and evaluate the syntax of the language statements.

Figure 7:
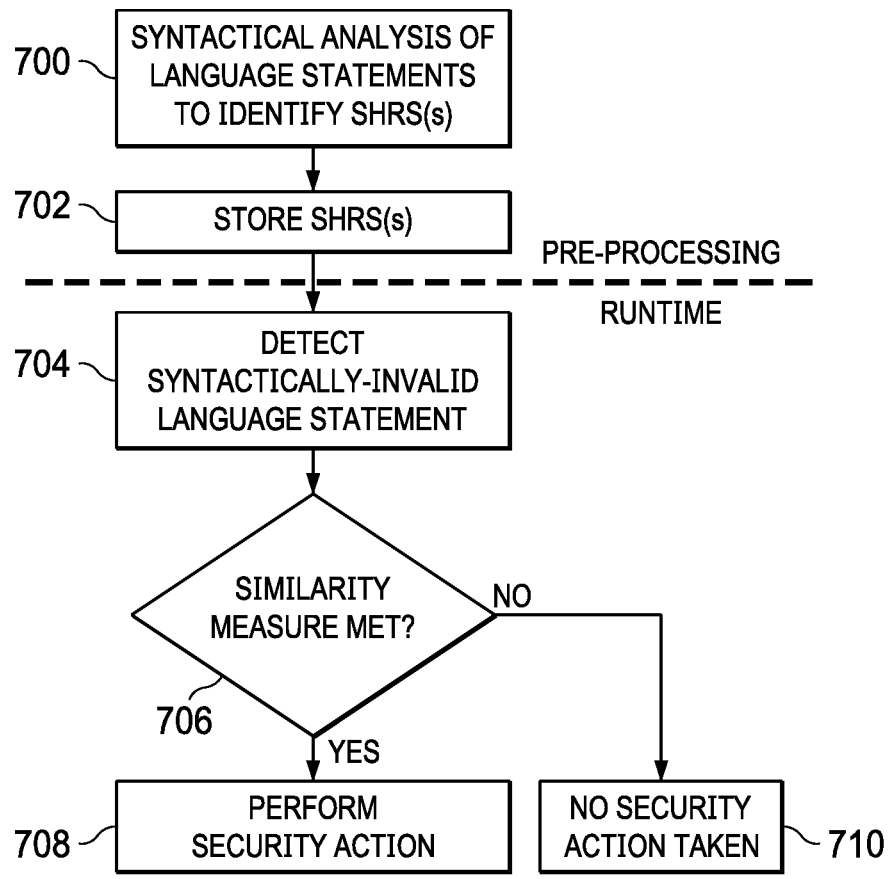
FIG. 7 illustrates a process flow depicting the technique of this disclosure.

In one embodiment, depicted in the process flow in FIG. 7, the SHRSs in a machine language used by a client/server application are identified in advance by automated syntactical analysis of the language statements that comprise the machine language. This is step 700. At step 702, the security system stores these SHRSs in a data store or memory, from which they can be readily evaluated against a syntactically-invalid language statement. Typically, the identification of the SHRSs statement from the machine language syntactical analysis occurs in a pre-processing, off-line or out-of-band (with respect to the request-response transaction processing flow itself) manner. Step 702 may also involve an information retrieval operation wherein a set of SHRSs are retrieved from a data source and returned to the security system for use. In one embodiment, the security system stores (or can otherwise obtain) a representation (e.g., an encoding) of each of the set of these high risk statements. At step 704, the security system detects that a request has a syntactically-invalid language statement. Typically, this occurs within the context of a request-response transaction processing flow such as described above in FIG. 3 and/or FIG. 4. As a result, and at step 706, the security system tests to determine whether the syntactically-invalid language statement has a measure of similarity sufficiently close to any of the set of one or more language statements in the SHRS set. Upon a positive determination that the syntactically-invalid language statement has the measure of similarity, at step 708 a given security action (e.g., dynamic masking) is taken with respect to the language statement. The given security action may also be rejecting the request, issuing a notification or alert, sandboxing the request for further analysis, logging the request, adding the syntactically-invalid language statement to the corpus of SHRSs, and others. If, however, the outcome of the test at step 706 is negative, the security system does not take the security action. This is step 710. Step 710 may also involve some other action unrelated to processing of the syntactically-invalid statement.

The particular operations (e.g., 708 and 710) are implementation-dependent and are not intended to be limiting.

In this way, the security system is configured to identify and appropriately manage sensitive information that may be present in these otherwise syntactically-incorrect statements after the language statement parsing fails. The nature and semantics of the sensitive information will vary depending on the client/server application; typically, the sensitive information is information that is desired to be protected against disclosure or use such as personally-identifiable information, credit card or other financial data, other proprietary information, etc. What is sensitive information or data thus will depend on the application, the machine language statements, and the various transaction processing use cases.

Figure 8:
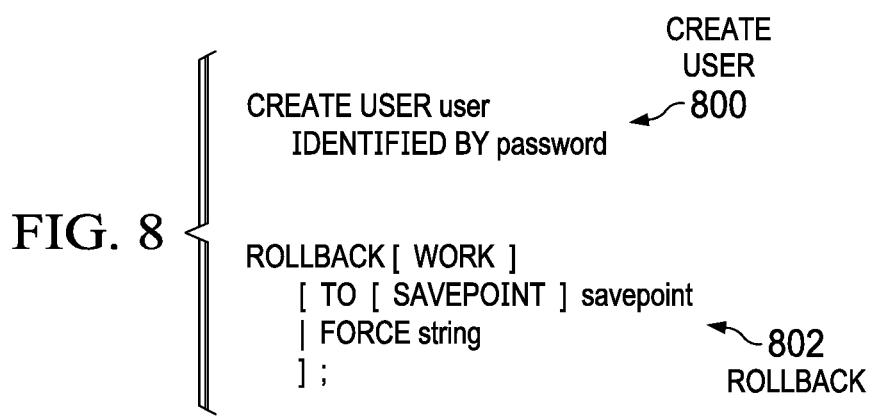
FIG. 8 depicts a pair of query examples and how such statements may potentially include sensitive information.

The process of identifying the SHRS statements is now described by way of an example. This example is based on the monitored system being an Oracle® database server, with SQL being the machine language. The technique herein is not limited to any particular type of monitored system, client-server application, machine language grammar, or set of language statements. Indeed, the subject matter herein may be implemented in any security system that monitors access to sensitive data between clients and servers including, without limitation, on-premises systems, hybrid systems, cloud-based services and the like. Referring now to FIG. 8, the simplified syntax of several SQL statements are depicted. Statement 800 (CREATE USER) has sensitive data (namely, "user" and "password"). Statement 802 (ROLLBACK), in contrast, has no sensitive data. Therefore, because only statement 800 is known by its syntax to contain sensitive data, it is classified as a SHRS and included in a group of security high risk statements, sometimes referred to herein by the acronym GSHRS.

There may be one or more GSHRS groupings, each of which comprises a set of one or more SHSRs. A GSHRS grouping may be a distinct type of security exploit.

In one embodiment, and in part to facilitate computational-efficiency of the similarity measure analysis that occurs during the request-response processing flow itself, each SHRS is represented in the security system in a particular format. This format may vary, but a preferred approach is to represent each language statement by a token encoding scheme. How this token encoding scheme may be implemented is depicted in FIG. 9. As shown there, and taking the statement 800 by way of example (because it is determined to be an SHRS), the security system parser uses a token vocabulary 900 that associates a particular integer value with each element of the language statement. Thus, in this example, the CREATE element is assigned token value 1, the USER element is assigned token value 2, and so on for the other elements. Preferably, each element in the SHRS language statement is assigned a unique integer value from the token vocabulary. Based on these assignments, the CREATE USER language statement is then encoded by applying a given function (e.g., concatenation) to the element token values. The given function may vary. In this example, the CREATE USER statement is encoded into the token value sequence {123456}. It is this sequence that is then stored (e.g., step 702, FIG. 7) as the representation of the SHRS language statement. Other SHRS statements have their own distinct encodings formed in a similar manner, and thus the set of SHRSs or GSHRs (as the case may be) comprise a plurality of such token value sequences.

With reference to FIG. 10, assume now that the security system parser has received statement 1000. This statement has a syntax error and is thus syntactically-invalid. This is because the statement has the word "BY" omitted. As such, the security system parser will not recognize the statement as containing sensitive data. Accordingly, without the technique of this disclosure, there is a likelihood that the statement then is logged with an entry that includes both the name PETER along with the password SECRET. The potential exposure of this sensitive information is avoided by the technique herein. In particular, and using this example, upon detecting the syntactically-invalid language statement 1000, the security system processes the statement in a manner similar to that described in FIG. 9, namely, by applying the token vocabulary and generating the token sequence for the invalid statement. Because only the term BY was omitted (from a properly-configured language statement), the result is the sequence {12346}. Using this sequence, the similarity measure (step 706, FIG. 7) is then carried out. There may be many different ways to compute the similarity measure. A preferred approach is to use a Levenshtein distance (LD). This is a measure of similarity between two (2) strings, namely, a source string (s) and a target string (t). In this computation, the distance is a number of deletions, insertions, or substitutions required to transform (s) into (t). An LD has an associated maximum distance (typically, a configurable value) that determines whether a computed distance measure has a positive outcome, namely, that the source and target strings are determined to be sufficiently similar. In other words, when a computed LD is within a maximal distance for the function, the source and target strings are considered sufficiently close. This is sometimes referred to as a match, although it is not required that the strings in question be the same.

Continuing with this example, assume that the maximal distance parameter is 6. The LD to transform {12346} into {123456} is just 1 (for one insertion). Because this value is less than the maximal distance, the security system treats language statement 1000 as an SHRS statement and masks the identified sensitive data. The resulting statement 1002 is in a form that can be exposed for external view without risk of compromising the user's sensitive data.

FIG. 11 provides a representative encoding (a token vocabulary) for a more complex example scenario, which is now described. This vocabulary represents one or more statements that are known to contain sensitive information. If a client were to send the statements without error, then as described above the command parser will recognize them as such, and then dynamically mask the sensitive information (or take some other specified security action). This is the default operation. If, however, the client misspells a statement, or omits an element (a token), etc., the command parser will produce an error and thus be unable to mask the sensitive information appropriately (absent the techniques herein). To provide several concrete example statements, consider the following set of SHRSs (and their associated token streams given the vocabulary in FIG. 11):
CREATE LOGIN user_name WITH PASSWORD='password'
{100, 101, 115, 102, 103, 113, 114}
RESTORE MASTER KEY FROM FILE='file_path' DECRYPTION BY PASSWORD='password'
{104, 105, 106, 107, 108, 113, 114, 111, 110, 103, 113, 114}.

Now, assume that the client sends the following statement:
"CREATE LOGIN myUserName WITH PASSWORD='123_complex_password'".

Because this statement is syntactically-valid, the command parser is successful and masks sensitive information before logging the following: "CREATE LOGIN ******** WITH PASSWORD=**************".

Now, however, assume the client later sends a first syntactically-invalid statement, e.g.:
SELECT someRecord FROM FROM myTable WHERE tableVal='Peter'.

This statement fails parsing (due to the repeated FROM element), so the system compares this statement's token stream (here, {109, 115, 107, 107, 115, 112, 115, 113, 114}) to the set of SHRSs that have been predetermined or configured (the two examples set forth above). As noted, in this approach a statement is considered sufficiently similar (to one of the SHRSs) when it falls within a configurable threshold of a tolerable number of required edits (e.g., to create a match to an existing SHRS). In this example, assume that the sensitivity of the similarity measure is "≤3" (meaning that if there are three (3) or fewer edits then the syntactically invalid statement will be considered sufficiently similar to the matching high risk statement). As also described, when the similarity measure is met, a security action (e.g., applying dynamic masking rules to the statement) is taken, as if the statement had successfully parsed in the first instance.

In this particular example, and given the two pre-computed high risk statement token streams, it would be necessary to add, drop or modify more than three (3) tokens to have the statement fit the definition of one of the high risk statements. As such, and the error notwithstanding, the statement passes (through the parsing operation) and thus is logged as not containing sensitive information.

Now, consider that the client later sends a second syntactically-invalid statement, e.g., "RESTORE MASTER KEY FROM FILE='file_path' DECRYPTION BY '123_super_secret_dec_password'".

This statement is missing the keyword PASSWORD, as well as the following=sign. As such, the statement fails parsing and generates the following token stream:
{104, 105, 106, 107, 108, 113, 114, 111, 110, 114}.
Applying the technique of this disclosure, this token stream is then compared to the set of high risk statements set forth above, and the match criteria (within three (3) edits), which in this example results in the following match:
RESTORE MASTER KEY FROM FILE='file_path' DECRYPTION BY PASSWORD='password'
{104, 105, 106, 107, 108, 113, 114, 111, 110, 103, 113, 114};
"RESTORE MASTER KEY FROM FILE='file_path' DECRYPTION BY '123_super_secret_dec_password'"
{104, 105, 106, 107, 108, 113, 114, 111, 110, 114}.
As can be seen, the security system only needs to make two (2) inserts, namely, tokens 103 and 113, in order for the statement token streams to align with one another. Because this falls within the threshold, the statements are considered to be sufficiently similar. As such, the invalid statement is treated as containing sensitive information, and the sensitive fields will be masked, such as shown in FIG. 12.

Thus, according to the technique herein, a preliminary identification and grouping of language statements by syntax is generated. These statements may be ranked according to possible security threat to form the set GSHRS. Subsequently, and in response to detection of a syntactically-invalid language statement (a parsing failure), the security system attempts to attribute that statement to one or more of the SHRSs. If such an attribution can be made, the security system is controlled to carry out a given security action, such as a dynamic data masking on the statement.

The particular manner in which the syntactically-invalid language statement is compared to the SHRSs is not a limitation. A preferred technique is edit distance, as determined by the Levenshtein distance computation. Other string similarity techniques (e.g., tri-gram comparison, Jaro-Winkler algorithm, etc.) may be used. Further, the manner in which a particular statement is determined to be syntactically invalid is not limited either; a statement may be found to be syntactically invalid in any way. Typically, it is equally likely that a first token is misspelled or omitted, as it is the second token, or any other token. Moreover, and as the examples above illustrate, the particular comparison threshold used in the similarity measure itself may be quite varied; in certain circumstances it may be desirable to use a looser threshold value such that even statements that appear to diverge from the corpus of actual SHRSs may still be characterized as including sensitive information, whereas for other situations, a more restrictive threshold value may be more appropriate. As also noted, the technique used to encode the language statements may also vary, and other token vocabularies and/or sequence-generating functions used. Finally, the term "closeness" should not be taken to require any absolute metric.

Thus, in general, the nature and type of parsing operation, the similarity measure and/or token encoding typically are implementation-dependent, all without departing from the subject matter of this disclosure.

The technique provides significant advantages. As has been described, the approach works by leveraging the logic of the security system to correlate statements with incorrect syntax to a group of statements known to contain sensitive information, and to enable the security system to respond accordingly, e.g., to dynamically mask or obfuscate sensitive data in such statements. The approach herein enables a security system to extend its operating capabilities, even when language statement parsing fails. In this way, the security system can be controlled to override its default behavior and still provide a security action with respect to the language statement that could not otherwise be parsed. Thus, the security system remains functional in the event of requests with misconfigured or corrupt syntax.

Although the technique has been described in the context of a failure of the parser to parse a client request, this is not a limitation. The technique may be used with respect to a response returned from the monitored system. More generally, the technique of comparing the language statement to a corpus of SHRSs of the machine language to control the security system operation may be applied in any application operating scenario, irrespective of the machine language, the nature and extent of the SHRSs, the type of statement encoding, the nature of the distance measure computation, and/or the nature or type of security action taken as a result of a determination that an language statement is sufficiently close to one or more SHSRs.

The approach herein is carried out without requiring changes to the monitored system, thereby providing easy configuration and management.

As previously noted, the technique is not limited for use in a database access control system having an intercepting agent and the EDSM (FIG. 4), although this is a representative system that benefits from the approach. As also mentioned above, the technique herein is not limited to the monitored server system being a database, as the approach herein may be leveraged with respect to any security system (e.g., see FIG. 3 for the general case) that includes a parser (e.g., a statement/command parser) configured to parse requests directed to a backend monitored system, and where request syntax errors interfere with the parser.

Generalizing, the enhanced security system functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the security system components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises a system for enforcing sensitive data protection as has described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to a multi-component transaction processing environment, but this will be a typical implementation. As noted, the above-described function may be used in any system, device, portal, site, or the like wherein request query (or, more generally, request or response) syntax may cause a parser failure.

Further, the technique described herein is not limited for use with any particular application protocol, and it may be applied in other application schemes generally. Thus, while the depicted approach is a preferred operating environment, the approach may be implemented in any application scheme wherein application client requests are processed for potential security violations in the manner described.

The techniques herein provide for improvements to another technology or technical field, namely, security systems, as well as improvements to the operational capabilities of such systems when used in the manner described.

Having described the invention, what is claimed is as follows.

The invention claimed is:

1. A method operative in a security system wherein requests structured according to a machine language are directed to a monitored system and examined for validation against a security policy, the machine language comprising a set of language statements, comprising:

performing a syntactic analysis on the machine language and, in response, identifying a set of one or more language statements of the machine language that, based on their syntax, include elements that are likely to contain or expose sensitive information;

responsive to detecting that a request has a syntactically-invalid language statement, wherein the syntactically-invalid language statement is a language statement that is misconfigured or corrupted, determining whether the syntactically-invalid language statement has a measure of similarity sufficiently close to any of the set of one or more language statements; and upon a determination that the syntactically-invalid language statement has the measure of similarity, taking a given security action.

2. The method as described in claim 1 wherein the given security action dynamically obfuscates a portion of the request.

3. The method as described in claim 1 wherein the measure of similarity is a syntactic edit distance.

4. The method as described in claim 3 wherein the measure of similarity is a Levenshtein distance measure.

5. The method as described in claim 1 wherein the monitored system is a database server and the request is a Structured Query Language (SQL) query.

6. The method as described in claim 1 wherein each language statement is represented by a data string that encodes elements of the language statement as a sequence of unique token values, and wherein the one or more language statements are represented as a ranked list of token sequences.

7. Apparatus configured as a security system wherein requests structured according to a machine language are directed to a monitored system and examined for validation against a security policy, the machine language comprising a set of language statements, comprising:

a processor;

computer memory holding computer program instructions executed by the processor, the computer program instructions comprising program code configured to:

perform a syntactic analysis on the machine language and, in response, identify a set of one or more language statements of the machine language that, based on their syntax, include elements that are likely to contain or expose sensitive information;

responsive to detecting that a request has a syntactically-invalid language statement, wherein the syntactically-invalid language statement is a language statement that is misconfigured or corrupted, determine whether the syntactically-invalid language statement has a measure of similarity sufficiently close to any of the set of one or more language statements; and upon a determination that the syntactically-invalid language statement has the measure of similarity, take a given security action.

8. The apparatus as described in claim 7 wherein the computer program code is further configured to dynamically obfuscate a portion of the request as the given security action.

9. The apparatus as described in claim 7 wherein the measure of similarity is a syntactic edit distance.

10. The apparatus as described in claim 9 wherein the measure of similarity is computed by the program code as a Levenshtein distance measure.

11. The apparatus as described in claim 7 wherein the monitored system is a database server and the request is a Structured Query Language (SQL) query.

12. The apparatus as described in claim 7 wherein each language statement is represented by a data string that encodes elements of the language statement as a sequence of unique token values, and wherein the one or more language statements are represented as a ranked list of token sequences.

13. A computer program product in a non-transitory computer readable medium, the computer program product holding computer program instructions executed by a processor as a security system wherein requests structured according to a machine language are directed to a monitored system and examined for validation against a security policy, the machine language comprising a set of language statements, the computer program instructions comprising program code configured to:

perform a syntactic analysis on the machine language and, in response, identify a set of one or more language statements of the machine language that, based on their syntax, include elements that are likely to contain or expose sensitive information;

responsive to detecting that a request has a syntactically-invalid language statement, wherein the syntactically-invalid language statement is a language statement that is misconfigured or corrupted, determine whether the syntactically-invalid language statement has a measure of similarity sufficiently close to any of the set of one or more language statements; and upon a determination that the syntactically-invalid language statement has the measure of similarity, take a given security action.

14. The computer program product as described in claim 13 wherein the computer program code is further configured to dynamically obfuscate a portion of the request as the given security action.

15. The computer program product as described in claim 13 wherein the measure of similarity is a syntactic edit distance.

16. The computer program product as described in claim 15 wherein the measure of similarity is computed by the program code as a Levenshtein distance measure.

17. The computer program product as described in claim 13 wherein the monitored system is a database server and the request is a Structured Query Language (SQL) query.

18. The computer program product as described in claim 13 wherein each language statement is represented by a data string that encodes elements of the language statement as a sequence of unique token values, and wherein the one or more language statements are represented as a ranked list of token sequences.

19. A security system associated with a monitored system, wherein requests directed to the monitored system are structured according to a machine language comprising a set of language statements, comprising:
- a data store storing a set of one or more first data strings, each of the first data strings being associated with a language statement of the machine language that, based on its syntax, has been determined by syntactic analysis to include elements that are likely to contain or expose sensitive information;
- computer program code executed by a hardware processor and configured to:
  - parse requests directed to the monitored system;
  - responds to detection of a request having a syntactically-invalid language statement, wherein the syntactically-invalid language statement is a language statement that is misconfigured or corrupted, to:
    - process elements of the syntactically-invalid language statement into a second data string;
    - determine a measure of similarity between the second data string and the first data string of each of the one or more language statements; and
    - based on the measure of similarity being indicative that the syntactically-invalid language statement presents a security exposure, taking a given security action.

20. The security system as described in claim 19 wherein each data string for a particular language statement is formed by:
- converting elements of the particular language statement into a token sequence, wherein each element has a unique integer value; and
- concatenating the unique integer values into the data string for the particular language statement.

* * * * *